United States Patent [19]
Saur et al.

[11] 3,792,813
[45] Feb. 19, 1974

[54] THERMOSTATIC VALVE FRAME STRUCTURE

[75] Inventors: Roland Saur; Wilhelm Schwarz, both of Stuttgart, Germany

[73] Assignee: Firma-Behr-Thomson Dehnstroffregler GmbH, Stuttgart, Germany

[22] Filed: Feb. 22, 1972

[21] Appl. No.: 227,819

[30] Foreign Application Priority Data
Feb. 26, 1971 Germany............................ 2109326

[52] U.S. Cl.................................. 236/100, 236/34
[51] Int. Cl............................................ F01p 7/16
[58] Field of Search..... 251/361; 236/34, 34.5, 100, 236/99, 93

[56] References Cited
UNITED STATES PATENTS

| | | | |
|---|---|---|---|
| 3,512,710 | 5/1970 | Resta | 236/34 |
| 3,591,075 | 6/1971 | Onishi | 236/34 |
| 1,590,922 | 6/1926 | Zimmerman | 236/34 |

*Primary Examiner*—William E. Wayner
*Attorney, Agent, or Firm*—Jacox & Meckstroth

[57] ABSTRACT

Valve frame structure which is particularly adapted to be a part of thermally responsive valve apparatus. The frame structure includes a sheet metal member which can be produced by a stamping, punching, or drawing operation, or the like. The sheet metal member has a folded portion for providing rigidity thereto and, in some modifications, the folded portion is used for attachment to another element or elements.

15 Claims, 7 Drawing Figures

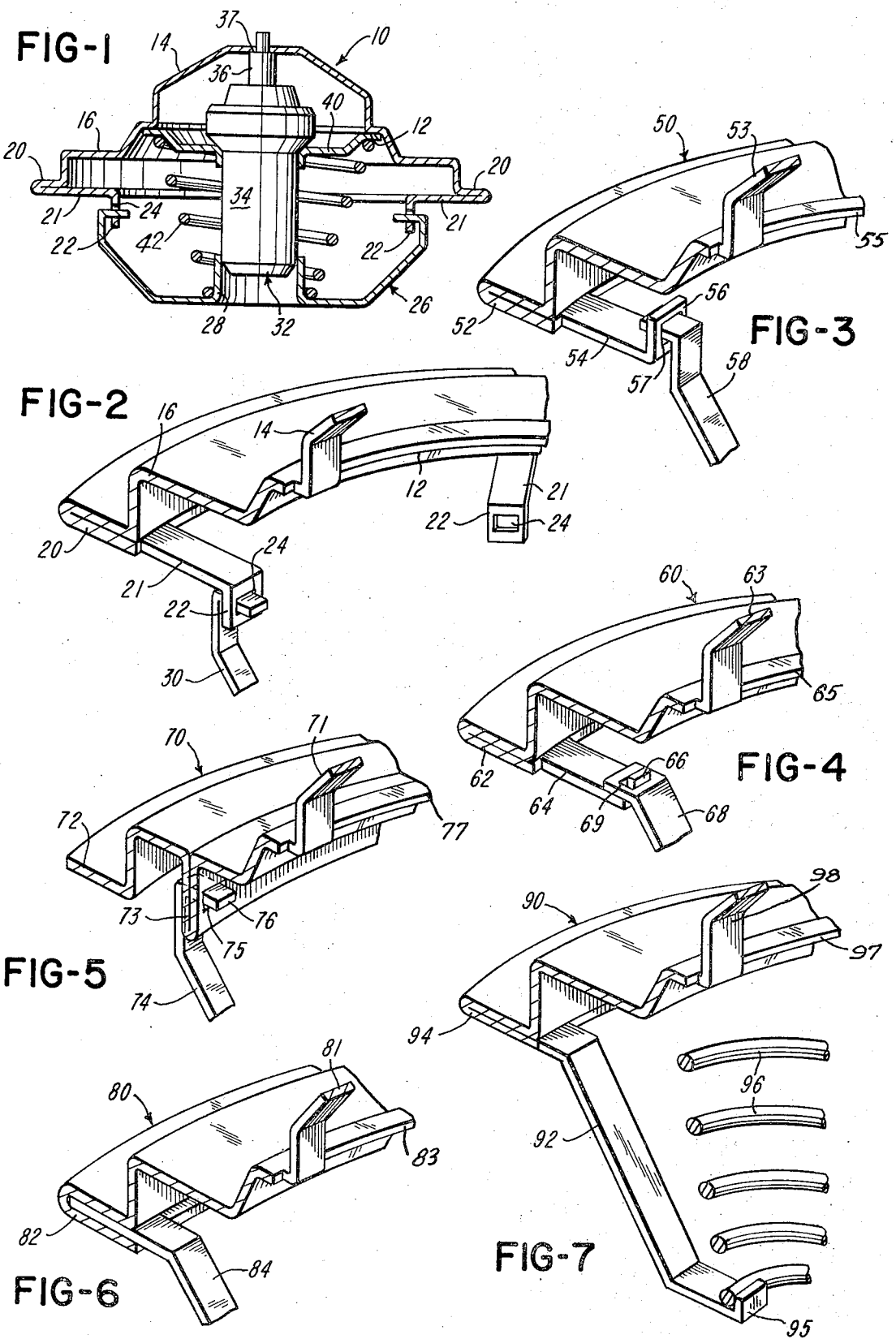

3,792,813

THERMOSTATIC VALVE FRAME STRUCTURE

BACKGROUND OF THE INVENTION

Numerous frame structures have been devised in regard to thermally responsive valve apparatus. However, most of the apparatus known have several individual elements which are attached together by brazing, soldering, welding, riveting or the like to form each member. Of course, members so constructed are relatively expensive and construction thereof requires considerable time.

It is therefore an object of this invention to provide valve frame structure for a thermally responsive valve apparatus in which a valve seat member and a support bridge can be produced by use of a single piece of sheet metal which is punched, stamped, drawn or the like.

It is another object of this invention to provide such a valve seat member which has a flange portion which is a folded part of the sheet metal material, and thus the flange portion is relatively strong and rigid.

Another object of this invention is to provide such a valve seat member to which other members of the valve apparatus can be easily and readily attached without riveting, welding, brazing, or the like.

Another object of this invention is to provide such frame structure by which a spring seat member of the apparatus can be an integral part of a valve seat member.

Other objects and advantages reside in the construction of parts, the combination thereof, the method of manufacture, and the mode of operation, as will become more apparent from the following description.

BRIEF DESCRIPTION OF THE DRAWING

FIG. 1 is a sectional view of thermally responsive valve apparatus constructed in accordance with this invention.

FIG. 2 is an enlarged fragmentary perspective sectional view of a portion of the apparatus shown in FIG. 1.

FIG. 3 is a fragmentary sectional perspective view of a modification of the portion of the apparatus shown in FIG. 2.

FIG. 4 is a fragmentary sectional perspective view of another modification of the portion of the apparatus shown in FIG. 2 and FIG. 3.

FIG. 5 is a fragmentary sectional perspective view of another modification of the portion of the apparatus shown in FIGS. 2, 3, and 4.

FIG. 6 is a fragmentary sectional perspective view of another modification of the portion of the apparatus shown in FIGS. 2, 3, 4, and 5.

FIG. 7 is a fragmentary sectional perspective view of another modification of the portion of the apparatus shown in FIGS. 2, 3, 4, 5, and 6.

DETAILED DESCRIPTION OF THE INVENTION

Apparatus of this invention as illustrated in FIGS. 1 and 2 comprises a member 10, preferably constructed of sheet metal material or the like, and having an annular valve seat portion 12, forming a fluid port. Extending upwardly from the valve seat portion 12 is a bridge portion 14. Extending downwardly from the valve seat portion 12 is an annular intermediate portion 16 and a flange portion 20. The valve seat portion 12, the intermediate portion 16, and the flange portion 20 are coaxial but non-coplanar.

As best shown in FIG. 2, the flange portion 20 consists of a folded part of the sheet metal material. The flange portion 20 is adapted to be secured between two sections of a fluid conduit, not shown, within which the apparatus of this invention is adapted to be positioned.

Also, as shown in FIG. 2, the flange portion 20 has a plurality of stems 21 extending therefrom, each of which has a lug 22 extending downwardly therefrom. Each lug 22 has an aperture 24.

A member 26 is attached to the member 10. The member 26 includes an annular guide portion 28, from which a plurality of arms 30 extend. The end of each arm 30 protrudes through the aperture 24 of one of the lugs 22, for attaching the member 26 to the member 10.

Encompassed by the members 10 and 26 is a thermally responsive actuator 32 which includes a container member 34 and a rod 36 extending therefrom. The thermally responsive actuator 32 may be any suitable type of thermally responsive actuator, but is preferably of the general type disclosed in U.S. Pat. No. 2,806,375, and 2,806,376, having thermally responsive expansible-contractible material within a container, with a rod extending from the container and with the rod and the container being relatively movable. The rod 36 of the actuator 32 extends through the bridge 14 and has a shoulder 37 engaging the bridge 14. The rod 36 has a portion within the container 34. The container 34 and the rod 36 are relatively movable.

Encompassing and preferably attached to the container 34 is a closure member 40. A resilient member, such as a coil spring 42, encompasses the container 34 and the guide portion 28, and engages the closure member 40 and the arms 30, and urges the closure member 40 toward the valve seat 12. Therefore, the closure member 40 is normally in engagement with the valve seat 12. Also, the container member 34, because it is engaged by the closure member 40 is urged toward the bridge 14 by the coil spring 42.

Thus, as the container 34 is subjected to temperatures above a predetermined value, there is relative movement between the container 34 and the rod 36. The container 34 and the closure member 40 move in a direction from the valve seat 12, and therefore the fluid port formed by the valve seat 12 is opened to permit flow of fluid therethrough. When the temperature to which the container 34 is subjected is reduced below a predetermined value, the container 34 and the closure member 40 are moved toward the valve seat 12 by the coil spring 42.

Because the flange portion 20 is a folded part of the sheet metal which forms the member 10, the flange portion 20 is relatively strong and rigid for clamping of the member 10 between two portions of a fluid conduit.

Due to the fact that the lugs 22 have the apertures 24 therein, the member 26 is easily and readily attached to the member 10 without the use of an attachment process such as soldering, welding, brazing, riveting, or the like.

FIG. 3

In the modification shown in FIG. 3 a member 50, which is similar to the member 10, has a flange 52, which consists of a folded part of the sheet metal of which the member 50 is formed. A bridge 53, similar to the bridge 14, is a part of the member 50 and extends from an annular valve seat portion 55 thereof. The flange 52 and the valve seat portion 55 are coaxial but non-coplanar. A plurality of stems 54 extend from the flange 52, one of which is shown in FIG. 3. Each stem 54 has a lug 56 normal thereto and extending upwardly therefrom. Each of the lugs 56 has an opening 57 therethrough through which the end of an arm 58 extends. Each arm 58 is part of a member such as the member 26, shown in FIG. 1.

FIG. 4

In the modification shown in FIG. 4, a member 60, similar to the member 10 is shown. The member 60 has a flange 62, which consists of a folded part of the sheet metal of which the member 60 is formed. A bridge 63, similar to the bridge 14 is a part of the member 60 and extends from an annular valve seat portion 65. The flange 62 and the valve seat portion 65 are coaxial but non-coplanar.

Extending from the flange 62 are a plurality of stems 64, one of which is shown in FIG. 4. Each stem 64 has a stud 66 normal thereto at the end thereof. An arm 68 is attached to each stem 64 as the arm 68 has an aperture 69 within which the stud 66 is positioned.

FIG. 5

In the modification of FIG. 5, a member 70, similar to the member 10, is shown. The member 70 has a bridge 71, similar to the bridge 14. The bridge 71 extends from a valve seat portion 77. The member 70 has a flange 72 which consists of a single thickness portion of the sheet metal material from which the member 70 is formed. The flange 72 and the valve seat portion 77 are coaxial but non-coplanar. The member 70 has a folded portion 73 which is spaced from the flange 72 and which is normal thereto and which extends in a direction generally opposite from that of the bridge 71. The folded portion 73 has attached thereto a plurality of arms 74 which may be similar to the arms 30 and which have an end part 76 extending through openings 75 in the folded portion 73.

FIG. 6

In the modification shown in FIG. 6, a member 80, similar to the member 10 is shown. The member 80 includes a bridge 81, similar to the bridge 14. The bridge 81 extends from a valve seat portion 83. The member 80 has a folded flange portion 82 which receives and retains the ends of a plurality of arms 84, one of which is shown in FIG. 6. The valve seat portion 83 and the flange portion 82 are coaxial but non-coplanar. The arms 84 may be similar to the arms 30.

FIG. 7

In the modification of FIG. 7, a member 90 is shown which may be similar to the member 10. The member 90 has a plurality of arms 92 which are integral therewith and which extend from a folded flange portion 94 thereof. The lower end of each of the arms 92 has an upwardly extending lug 95 which retains the lower end of a coil spring 96, which is similar to the coil spring 42 of FIG. 1. The member 90 has a valve seat portion 97 from which a bridge 98 extends. The valve seat portion 97 and the flange portion 94 are coaxial but non-coplanar.

SUMMARY

Thus, it is understood that a frame member 10, 50, 60, 70, 80, and 90 can be formed by simple drawing, punching, and folding operations, and arm members for support of a spring member and for support of guide means, may be attached to the members 10, 50, 60, 70, 80, and 90 without welding, soldering, brazing, riveting and the like. Thus, thermostatically operable valve apparatus can be produced in mass production operations at relatively low costs.

Although the preferred embodiment and modifications of the device have been described, it will be understood that within the purview of this invention, various changes may be made in the form, details, proportion and arrangement of parts, the combination thereof, and mode of operation, which generally stated consist in a device capable of carrying out the object set forth, as disclosed and defined in the appended claims.

The invention having thus been described, the following is claimed:

1. In thermally responsive valve apparatus having a thermally responsive actuator, a frame member consisting of a single piece of sheet material having a plurality of coaxial, but non-coplanar portions, the frame member having a substantially coplanar annular valve seat portion forming a fluid port, and an annular folded portion substantially coaxial with the fluid port, the folded portion being in a plane which is spaced substantially from the plane of the annular valve seat portion, the frame member having a bridge integral therewith and extending from the valve seat portion.

2. The apparatus of claim 1 in which the frame member has a flange portion and the folded portion is spaced from the flange portion and is substantially normal thereto, the folded portion having openings therein for receipt of means for attachment of the frame member to another member.

3. The apparatus of claim 1 in which the folded portion of the frame member constitutes a flange portion of the frame member.

4. The apparatus of claim 1 in which the folded portion of the frame member constitutes a flange and in which a plurality of stems extend from the flange, each stem having an aperture therethrough for attachment of the frame member to another member.

5. The apparatus of claim 1 in which the folded portion of the frame member constitutes a flange and in which a stem extends from the flange and has a stud at the end thereof substantially normal to the stem for attachment of the frame member to another member.

6. The apparatus of claim 1 which includes attachment means which extend from the folded portion integral therewith.

7. The apparatus of claim 6 which includes a coil spring which is in engagement with the attachment means.

8. The apparatus of claim 1 which includes attachment means partially disposed within the folded portion and extending therefrom.

9. The apparatus of claim 4 in which the end of each stem has a portion substantially normal thereto through which the aperture extends.

10. Thermally responsive valve apparatus comprising:

a first sheet metal frame member, the first sheet metal frame member having a folded portion, an annular valve seat portion forming a flow passage therethrough, an integral bridge extending across the flow passage, a second sheet metal frame member, the second sheet metal frame member having an annular guide member and a plurality of arms integral therewith and extending therefrom, each of the arms being attached to the first frame member, a thermally responsive actuator member having a portion encompassed by the guide member and having a portion engaging the bridge, a closure member engageable with the valve seat portion of the first member and encompassing a portion of the actuator member, a helical spring in engagement with the arms of the second frame member and in engagement with the closure member and encompassing a portion of the actuator member.

11. The apparatus of claim 10 in which the folded portion of the first frame member is a flange portion thereof.

12. The apparatus of claim 10 in which the first frame member includes attachment means for attaching the second frame member to the first frame member.

13. The apparatus of claim 12 in which the attachment means of the first frame member comprise a plurality of stems, each of which has a lug at the end thereof provided with an aperture therein, and in which each of the arms of the second frame member has a portion extending through an aperture of one of the lugs for attachment of the second frame member to the first frame member.

14. The apparatus of claim 10 in which the first frame member has a flange portion and the folded portion is spaced from the flange portion.

15. The apparatus of claim 14 in which the folded portion has a plurality of apertures therethrough, each of the arms extending through one of the apertures.

* * * * *